3,198,442
NOZZLES
Mannie Brenner, Cambridge, Mass., assignor to W. R. Grace & Co., Cambridge, Mass., a corporation of Connecticut
Filed June 28, 1963, Ser. No. 291,315
5 Claims. (Cl. 239—601)

This invention relates to tips for lining machine nozzles designed to apply gasketing material to the end closures of containers, particularly but not exclusively to ends destined for use in composite cans.

The art of container sealing has an established terminology which will be used in this specification. The walls of the container are known as the "body." The end closures are known as "ends." The gasket which is interposed between the ends and body and is responsible for the hermetic or liquid-tight seal between the parts is known as the "lining." The plastic or liquid composition which, upon cooling or drying forms the solid gasket, is known as "lining."

Lining is performed by forcing a stream of lining compound through a small valved nozzle onto the sealing area of an end which is rotating rapidly beneath the nozzle. Thus, the lining is deposited in a peripheral band. Each nozzle terminates in a removable and interchangeable tip—interchangeable because not only do the tips wear, but ends of different size require tip bores of different diameters.

For years the composite container, i.e. containers having wound paper bodies and metallic ends crimped to the body, have been used to hold dry materials such as cleaning powders. Now that the paper bodies can be laminated with effective, liquid-impervious materials such as metal foil and plastic, composite cans are progressively invading the field formerly reserved for the "all-metal" containers. The use of the composite can for packaging automotive lubricating oil is an example.

Although a simple crimp of the metal into the paper body sufficed when powders only were packaged, a fluid-tight seal is required when liquids are to be retained. Effective seals have required a new technology. The sealing compounds themselves and their mode of application differ from that previously practiced with "all-metal" containers.

The ends of a container are surrounded by a peripheral channel on the floor of which the sealing material normally has been placed. To seal a composite container, however, the sealing material must be placed high on the shoulder of the end, i.e. high on the vertical interior wall of the channel. Since, in modern lining machines, the end is revolving at some 2500 r.p.m. as the sealing composition is discharged onto it, conventional lining compounds would be thrown out of position by the centrifugal force. Effective lining compounds are, therefore, high viscosity materials possessing high adhesion to metal and sufficient cohesion to resist the centrifugal forces which are involved. To force such a material through the very small opening in the nozzle tip requires head pressures which are greatly in excess of those encountered in "all-metal" lining practice. Instead of the few ounces to few pounds of head pressure employed in "all-metal" container end lining, the head pressures which are required for the lining of composite can ends frequently are in the order of 70 pounds.

With such compounds under such pressures, spattering and "nozzle build-up" is a serious problem. Spattering causes the ends to stick together when they are stacked and causes feeding problems in the closing operations which follow. "Nozzle build-up" requires the frequent shut-down of the machine and cleaning of the nozzles.

In the extrusion of plastics, it has been recognized that the elastic recovery of the extruded material from the stresses imposed upon it during its flow, causes the extrudate to swell and to assume a diameter greater than of the orifice through which it was extruded.

It seemed to me possible that high relaxation stress in the extruded container sealing compounds was responsible for spatter and that the elastic recovery of the compound took the form of the unrestricted expansion of the exudate which is observed. Recognizing this, it seemed possible to me that if the bore in the tip immediately adjacent the orifice were enlarged sufficiently so that enough expansion could take place within the restriction of the enlarged bore, the relaxation stress causing spattering and disruption of the extruded stream would be dissipated before the extruded stream emerged beyond the confines of the nozzle-tip and that disruption of the extruded stream and its consequent spattering might not then occur. This has indeed proved to be the case. An enlargement of the bore immediately behind the orifice or enlargement of the orifice itself does stop spattering.

Another problem was caused by "drool." This can best be explained with the aid of the figures in which FIG. 1 (dashed) is a vertical cross-section of a typical nozzle-tip presently in use for forming shoulder linings.

Figure 1:
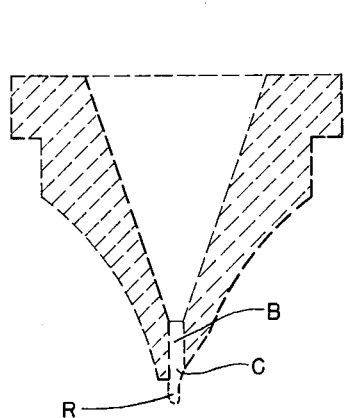

Shoulder linings cannot be properly placed on ends designed for use with several forms of composite containers unless the sealing compound is discharged from the nozzle at some angle off the vertical. The dashed outline of FIG. 1, represents the cross-section of a nozzle-tip typical of those which, in the past, have been used for this purpose.

Since part of the wall of the bore B, is cut away at C, the ejected stream, in the main, departs at an angle inclined about 45° to the vertical. Not only will the lining compound spatter badly but the nozzles "drool." If the machine is stopped, a residuum of compound will be seen hanging from the tip as shown by the dotted outline R. In the repetitive operation of the nozzle, these accumulated residue transfer to the leading edge of the nozzle-tip, build up, and foul it.

It seemed to me that the surface tension of the lining compound was of a high enough order to support a short, capillary column of compound if a meniscus was allowed to form and that the cause of nozzle drooling might be that because the wall of the capillary bore (a common bore diameter is 0.028 inch) had been cut away, a meniscus could not form.

Figure 2:
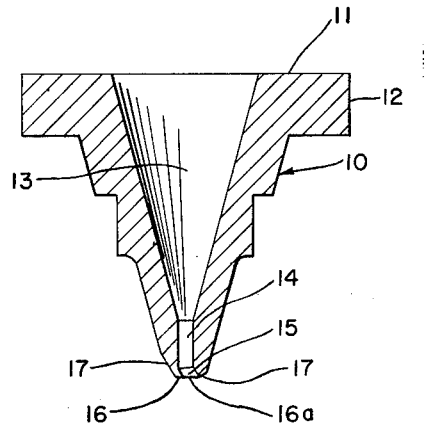
FIG. 2 is a vertical cross-section of the improved nozzle-tip.

When the tip opening was made to occupy but a single, horizontal plane, as shown at 16a FIG. 2, a meniscus which did support the material in the capillary did form and drooling ceased.

Assuming a bore diameter of 0.028 inch (a #70 drill) the area of the bore equals 0.000616 sq. in. When the upper base (apex) of the tip is horizontal and the angled portion of the bore lies at 45° to the vertical, the area of the orifice, 16a, becomes 0.00347 sq. in. If the angular portion of the bore lies at 30° to the vertical, the area of the orifice becomes 0.00225 sq. in. Thus, the opening area of the orifice is generally at least twice the area of the immediately adjacent bore and preferably, between about 3 to 6 times the area of the immediately adjacent bore. This degree of enlargement of the orifice is sufficient to produce an instantaneous, controlled stress relaxation. Spatter and disruption does not occur. At the same time, drool is prevented, for, since the opening lies in a horizontal, plane surface, a meniscus forms. As for other bore sizes, which usually follow numbered drill sizes from #60 (0.040″) to #72 (0.025″), enlargement of the orifice in the same proportion as above produces the same effects.

Another source of fouling the nozzle-tip is chuck or can-end wobble. If a slightly bent end causes the end to revolve in an interfering path with the leading edge of the tip of FIG. 1, the tip will act as a plow and scoop off some of the freshly deposited sealing compound. Reducing the area of the upper base by tapering the tip to leave a wall thickness about the orifice of about 1/64 of an inch at the opening, not only materially reduces plowing, but brings any pendant compound so closely adjacent the emerging jet that it merges with it and is carried away. To a large extent, such modified nozzles are self-cleaning.

Figure 3:
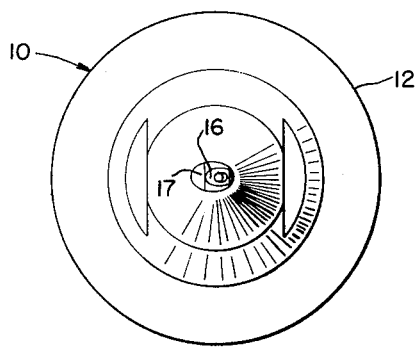
FIG. 3 is an end-view (the upper base of the cone faces the reader) of the improved nozzle-tip of FIG. 2.

The improved nozzle-tip is illustrated in FIGS. 2 and 3. The tip, 10, has a generally conical shape with about a 30° included angle and having parallel upper and lower bases. The lower base, 11, is surrounded by a flange, 12, which, engaged by a shouldered nut, holds the tip to the valve mechanism. The bore, 13, is formed with a 30° taper which forms the seat for the valve needle (not shown) and terminates in two cylindrical portions, an axial bore, 14, about 0.052 inch long if the bore diameter is 0.028 inch, and an intersecting angular bore, 15, departing at angles of from 30° to 45° from the vertical axis. The upper base, 16, is ground flat and normal to the vertical axis. The wall area, 17, of the tip is ground to an angle of 30° to 45° to the vertical axis so that no portion of the flat upper base, 16, which surrounds the orifice, 16a, is wider than 1/64 of an inch.

Figure 4:
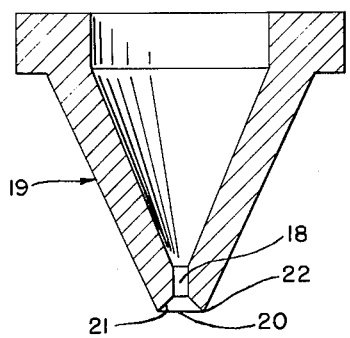
FIG. 4 is a vertical cross-section of the improved nozzle-tip adapted for "vertical" lining.

When it is necessary to line the ends with a stream of compound directed vertically downwards, the orifice of the tip may be modified as shown in FIG. 4. The axial bore 18, of the tip 19, is conically counterbored as shown at 21, to enlarge the area of the orifice 20, in approximately the same proportions as has previously been described, e.g. if the bore, 18, is 0.028 inch in diameter the enlargement should produce an opening having an area of between 0.00345 and 0.00225 sq. in. In this instance, the horizontal plane surface of the upper base, 22, may be reduced to a line of intersection if the re-entrant bore is a cone of about 80° included angle. In any case, no portion of the horizontal plane surface, 22, surrounding the orifice 20, should be wider than 1/64 of an inch.

As in the case of the tip of FIG. 2, the improved tip of FIG. 4, controls the relaxation stress and prevents spattering of the compound Also, a meniscus forms across the horizontal area of the orifice 20, whenever the needle valve is closed This form of nozzle is equally free from "drool."

The result of these semingly minor changes is surprising. Whereas, with a nozzle-tip having the configuration shown in FIG. 1, all of the ends were spattered with compound, during lining, and shut-down of the machine was required immediately to permit the cleaning of the nozzle and the machine. The same lining compound under the same head pressure and at the same lining temperature but employing the nozzles of this invention can be run substantially uninterruptedly for a whole working shift and longer without spattering the ends or fouling the nozzle sufficiently to call for machine shut-down and clean-up.

I claim:

1. A nozzle tip for use in combination with a container closure lining machine nozzle adapted to place high viscosity lining compound high on the shoulder of container end closures, the said tip having a circular peripheral attachment flange, the remainder of said tip having a generally conic shape, a bore formed in the tip concentric with the vertical axis of the cone, one portion of said bore being formed at a taper of approximately 30° thereby to provide a seat for the valve needle of the lining machine nozzle, the said tapered portion terminating in a cylindrical bore having a diameter of 0.040 to 0.025 inch, the length of the said cylindrical bore being approximately twice its diameter, the said tip having upper and lower faces parallel to each other and normal to the vertical axis of the cone, no portion of the wall surrounding the orifice having a width greater than 1/64 of an inch.

2. A nozzle tip for use in combination with a container closure lining machine nozzle adapted to place high viscosity lining compound high on the shoulder of container end closures, the said tip having a circular peripheral attachment flange, the remainder of said tip having a generally conic shape, a bore formed in the tip concentric with the vertical axis of the cone, one portion of said bore being formed at a taper of approximately 30° thereby to provide a seat for the valve needle of the lining machine nozzle, the said tapered portion terminating in a cylindrical bore having a diameter of 0.040 to 0.025 inch, the length of the said cylindrical bore being approximately twice its diameter, the said cylindrical bore having an enlarged opening forming the tip orifice, the area of which is from 2–6 times the diameter of the said cylindrical bore, said tip having upper and lower faces parallel to each other and normal to the vertical axis of the cone, no portion of the wall surrounding the orifice having a width greater than 1/64 of an inch.

3. A nozzle tip for use in combination with a container closure lining machine nozzle adapted to place high viscosity lining compound high on the shoulder of container end closures, the said tip having a circular peripheral attachment flange, the remainder of said tip having a generally conic shape, a bore formed in the tip concentric with the vertical axis of the cone, one portion of said bore being formed at a taper of approximately 30° thereby to provide a seat for the valve needle of the lining machine nozzle, the said tapered portion terminating in a cylindrical bore having a diameter of 0.040 to 0.025 inch, a bore having a diameter equal to that of the said cylindrical bore intersecting the said cylindrical bore at an angle of from 30–45° and terminating in a tip orifice, the said tip having upper and lower faces parallel to each other and normal to the vertical axis of the cone.

4. A nozzle tip for use in combination with a container closure lining machine nozzle adapted to place high viscosity lining compound high on the shoulder of container end closures, the said tip having a circular peripheral attachment flange, the remainder of said tip having a generally conic shape, a bore formed in the tip concentric with the vertical axis of the cone, one portion of said bore being formed at a taper of approximately 30° thereby to provide a seat for the valve needle of the lining machine nozzle, the said tapered portion terminating in a cylindrical bore having a diameter of 0.040 to 0.025 inch, the said tip having upper and lower faces parallel to each other and normal to the vertical axis of the cone, a re-entrant, conical, coaxial bore communicating with said cylindrical bore projecting inwardly from the upper face to provide a tip orifice having a diameter of from 2–6 times the area of the said cylindrical bore and no portion of the wall surrounding the orifice having a width greater than 1/64 of an inch.

5. In combination with container closure lining machinery wherein a highly plastic containing lining compound is ejected through a valved lining nozzle onto a closure shell to form a sealing gasket therein, said valved nozzle having a nozzle tip adapted to place high viscosity lining compound high on the shoulder of container end closures, the said tip having a circular peripheral attachment flange, the remainder of said tip having a generally conic shape, a bore formed in the tip concentric with the vertical axis of the cone, one portion of said bnre being formed at a taper of approximately 30° thereby to provide a seat for the valve needle of the lining machine nozzle, the said tapered portion terminating in a cylindrical bore having a diameter of 0.040 to 0.025 inch, the length of the said cylindrical bore being approximately twice its diameter and communicating with an orifice, the said tip having upper and lower faces parallel to each other and normal to the vertical axis of the cone, no portion of the wall surrounding the orifice having a width greater than 1/64 of an inch.

References Cited by the Examiner

UNITED STATES PATENTS

| | | | |
|---|---|---|---|
| 1,380,403 | 6/21 | March | 239—602 |
| 2,406,941 | 9/46 | Brooks | 239—601 |
| 2,536,832 | 1/51 | Altorfer | 239—600 |
| 3,003,755 | 10/61 | Peras | 239—579 |
| 3,015,302 | 1/62 | Miller et al. | 239—548 |
| 3,019,938 | 2/62 | Miller et al. | 239—548 |
| 3,022,955 | 2/62 | Riddell | 239—583 |
| 3,107,860 | 10/63 | Umbricht | 239—601 |

FOREIGN PATENTS

| | | |
|---|---|---|
| 1,203,550 | 10/59 | France. |
| 1,035,577 | 7/58 | Germany. |

EVERETT W. KIRBY, *Primary Examiner.*